(12) United States Patent
Siriwardane et al.

(10) Patent No.: US 9,004,911 B1
(45) Date of Patent: Apr. 14, 2015

(54) APPARATUS AND METHOD FOR SOLID FUEL CHEMICAL LOOPING COMBUSTION

(71) Applicants: Ranjani V. Siriwardane, Morgantown, WV (US); Justin M. Weber, Morgantown, WV (US)

(72) Inventors: Ranjani V. Siriwardane, Morgantown, WV (US); Justin M. Weber, Morgantown, WV (US)

(73) Assignee: U.S. Department of Energy, Washington, DC (US)

( * ) Notice: Subject to any disclaimer, the term of this patent is extended or adjusted under 35 U.S.C. 154(b) by 0 days.

(21) Appl. No.: 13/688,260

(22) Filed: Nov. 29, 2012

(51) Int. Cl.
*F23D 3/40* (2006.01)
*F23C 10/01* (2006.01)
*F23B 30/00* (2006.01)
*F23C 13/08* (2006.01)

(52) U.S. Cl.
CPC . *F23C 10/01* (2013.01); *F23B 7/00* (2013.01); *F23C 13/08* (2013.01); *F23G 2900/50202* (2013.01); *F23G 2201/50* (2013.01); *F23G 2201/40* (2013.01)

(58) Field of Classification Search
CPC .......... F23C 2900/99008; F23C 2201/30; F23C 2201/40; F23C 2201/50; F23C 2900/50202
USPC ...................... 431/7; 423/224, 231
See application file for complete search history.

(56) References Cited

U.S. PATENT DOCUMENTS 4,345,173 A * 8/1982 Marchant et al. ............. 310/11
4,435,374 A * 3/1984 Helm, Jr. .................. 423/418.2
7,168,431 B2 * 1/2007 Li et al. ........................ 131/334
8,011,374 B2 * 9/2011 Rabiei et al. .................. 131/356
2005/0232859 A1 * 10/2005 Sanfilippo et al. ............ 423/652
2005/0279188 A1 * 12/2005 Derderian ..................... 75/627
2013/0125462 A1 * 5/2013 Greiner et al. .................. 48/61

OTHER PUBLICATIONS

Mattison et al., "Chemical-looping with oxygen uncoupling for combustion of solid fuels", International Journal of Greenhouse Gas Control, 3 (2009) 11-19.*
Campbell et al., "Kinetic Studies of Gas Evolution During Pyrolysis of Subbituminous Coal", Lawrence Livermore Laboratory, University of California, Livermore, Ca—94550 (This work was performed under the aus pices of the U. S. Energy Research & Development Administration , under contract No. W-7405-Eng-48.).*

(Continued)

*Primary Examiner* — Kenneth Rinehart
*Assistant Examiner* — Gajanan M Prabhu
(74) *Attorney, Agent, or Firm* — James B. Potts; Brian J. Lally; John T. Lucas

(57) ABSTRACT

The disclosure provides an apparatus and method utilizing fuel reactor comprised of a fuel section, an oxygen carrier section, and a porous divider separating the fuel section and the oxygen carrier section. The porous divider allows fluid communication between the fuel section and the oxygen carrier section while preventing the migration of solids of a particular size. Maintaining particle segregation between the oxygen carrier section and the fuel section during solid fuel gasification and combustion processes allows gases generated in either section to participate in necessary reactions while greatly mitigating issues associated with mixture of the oxygen carrier with char or ash products. The apparatus and method may be utilized with an oxygen uncoupling oxygen carrier such as CuO, $Mn_3O_4$, or $Co_3O_4$, or utilized with a $CO/H_2$ reducing oxygen carrier such as $Fe_2O_3$.

9 Claims, 3 Drawing Sheets

(56) References Cited

OTHER PUBLICATIONS

Siriwardane et al., "Evaluation of reaction mechanism of coal-metal oxide interactions in chemical-looping combustion," Combustion and Flame 157 (2010) 2198-2208.

Cao et al., "Investigation of Chemical Looping Combustion by Solid Fuels. 2. Redox Reaction Kinetics and Product Characterization with Coal, Biomass, and Solid Waste as Solid Fuels and CuO as an Oxygen Carrier," Energy & Fuels 2006, 20, 1845-1854.

Siriwardane et al., "Chemical-Looping Combustion of Coal with Metal Oxide Oxygen Carriers," Energy & Fuels 2009, 23, 3885-3892.

Leion et al., "Using chemical-looping with oxygen uncoupling (CLOU) for combustion of six different solid fuels," Energy Procedia 1 (2009) 447-453.

Wang et al., "Mechanistic investigation of chemical looping combustion of coal with Fe2O3 oxygen carrier," Fuel 90 (2011) 2359-2366.

\* cited by examiner

US 9,004,911 B1

APPARATUS AND METHOD FOR SOLID FUEL CHEMICAL LOOPING COMBUSTION

GOVERNMENT INTERESTS

The United States Government has rights in this invention pursuant to the employer-employee relationship of the Government to the inventors as U.S. Department of Energy employees and site-support contractors at the National Energy Technology Laboratory.

FIELD OF TILE INVENTION

The disclosure relates to a fuel reactor for a chemical looping combustion system having a fuel section and an oxygen carrier section separated by a porous divider, where the porous divider provides for fluid communication between the fuel section and the oxygen carrier section while preventing the passage of solids greater than a specific size. The disclosure additionally relates to method of conducting a chemical looping combustion process utilizing the fuel reactor disclosed.

BACKGROUND

In chemical looping combustion, oxygen is transferred from an air reactor to fuel reactor utilizing an oxygen carrier, typically a metal oxide. The oxygen earners are reduced and fuel is oxidized in the fuel reactor, after which the reduced oxygen carriers are returned to the air reactor for regeneration to an oxidized state. With this arrangement, the fuel and the air remain separated, and the process generates a stream of oxygen depleted air leaving the air reactor and a stream of combustion gases, mainly $CO_2$ and $H_2O$, leaving the fuel reactor. After condensing he water, relatively pure $CO_2$ is obtained from the exhaust gas of the fuel reactor. Correspondingly, $CO_2$ separation is inherent to the process.

When gaseous fuels are utilized in chemical looping combustion systems, the fuel is introduced into the fuel reactor as a reducing gas, and appropriate reaction between the oxygen carrier and the reducing gas becomes largely a function of facilitating germane thermodynamic conditions. However, in contrast to these gaseous fuel approaches, significant differences arise when utilizing a solid carbonaceous fuel such as coal, coke, coal and biomass char, and the like. Since fossil carbon largely occurs as a solid rather than as or liquid, it is desirable to adapt the chemical looping combustion process to solid fuels. Generally, this is accomplished by either directly introducing the solid fuel into the fuel reactor, or by first gasifying the solid fuel in a primary step to generate a gaseous fuel, following gaseous fuel chemical looping combustion. The latter method is less desirable due to the necessity for a separate, preliminary gasifier.

When solid fuels are directly introduced into the fuel reactor of a chemical looping combustion system, fuel conversion generally proceeds through drying, devolatilization, and gasification, described in reactions (1) and (2) below:

$$\text{Solid fuel} \rightarrow \text{volatiles} + \text{char} \quad (1)$$

$$C + H_2O \rightarrow CO + H_2 \quad (2)$$

Depending on the type of oxygen carrier utilized, such as $Fe_2O_3$, gases produced by devolatilization and gasification can interact with and be oxidized by the oxygen carrier according to:

$$C_nH_{2m} + (2n+m)Me_xO_y \rightarrow nCO_2 + mH_2O + (2n+m)Me_xO_{y-1} \quad (3)$$

$$C + H_2O/CO_2 \rightarrow CO + H_2/CO \quad (4)$$

$$H_2/CO + Me_xO_y \rightarrow H_2O/CO_2 + Me_xO_{y-1} \quad (5)$$

Alternatively, an oxygen carrier such as CuO may be utilized which releases gaseous oxygen in the fuel reactor according to:

$$2Me_xO_y \rightarrow 2Me_xO_{y-1} + O_2 \quad (6)$$

Following the applicable reactions above in the fuel reactor, the reduced oxygen carrier is then oxidized in the air reactor according to:

$$O_2 + 2Me_xO_{y-1} \rightarrow 2Me_xO_y \quad (7)$$

When utilizing directly introduced solid fuels, the applicable fuel reactor reactions are typically generated by fluidizing both the fuel and the oxygen carrier in the fuel reactor, which can generate several significant issues typically not present when gaseous fuels are utilized. For example, with both oxygen carrier and fuel particles present in the fuel reactor, there is significant risk that char may follow the oxygen carrier particle flow and proceed to the air reactor, where it burns and produces $CO_2$. Consequently, char separation between the fuel reactor and the air reactor is necessary. Typically a carbon stripper must be utilized specifically for this purpose. See e.g., U.S. Pat. No. 7,767,191 to Thomas et al., issued Aug. 3, 2010; U.S. Pat. No. 7,824,574 issued to White et al., issued Nov. 11, 2010; U.S. patent application Ser. No. 13/375,957 by Beal et al., Pub. No. US 2012/0167808 published Jul. 5, 2012; and U.S. patent application Ser. No. 13/272,647 by Cao et al., Pub. No. US 2012/0124106 published Aug. 23, 2012, among others. Additionally, the solid fuel generates ash in the fuel reactor, and interaction between ash particles and the oxygen carrier leads to gradual deactivation of the oxygen carrier. See e.g., Siriwardane et al., "Chemical Looping Combustion of Coal with Metal Oxide Oxygen Carriers," Energy & Fuels 23 (2009); see also Wang et al., "Mechanistic investigation of chemical looping combustion of coal with Fe2O3 Oxygen Carrier," Fuel 90 (2011), among others. Further, when the ash is periodically discharged from the fuel reactor, oxygen carrier particles may be elutriated in the ash stream and lost from the system, and similar inactivation and separation issues may be expected with the additional use of oxides, halides, and carbonates as char gasification catalysts in the fuel reactor. Thus, for chemical looping processes utilizing solid fuels, the system must be optimized to obtain satisfactory separation between the oxygen carrier and both the char and ash produced in the fuel reactor.

It would he advantageous to provide a fuel reactor for a chemical looping combustion system which allowed various fuel reactor reactions to occur in a manner which maintained separation between the oxygen carrier and the solid fuel during the reactions. Such a fuel reactor would greatly mitigate the additional issues associated with solid fuel chemical looping combustion, such as the necessity for carbon stripping, detrimental oxygen carrier—ash interactions, and loss of the oxygen carrier with the ash stream. Such a fuel reactor would further allow for the addition of catalytic materials to increase and manage solid fuel gasification while minimizing impact on the oxygen carrier.

These and other objects, aspects, and advantages of the present disclosure will become better understood with reference to the accompanying description and claims.

SUMMARY

The apparatus and Method disclosed utilizes fuel reactor comprised of a fuel section and an oxygen carrier section, and further comprised of a porous divider separating the fuel section and the oxygen carrier section. The porous divider is comprised of a material allowing fluid communication between the fuel section and the oxygen carrier section while preventing the migration of solids of a particular size, for example, particles generally greater than about 25 microns. The porous divider may be comprised of screen, mesh, or other materials which provide for fluid communication between the respective sections while preventing the transfer of solids larger than a specific size.

Maintaining particle segregation between the oxygen carrier section and the fuel section during solid fuel gasification and combustion processes allows gases generated in either section to participate in necessary reactions while greatly mitigating or preventing any mixture of the oxidized and reduced carriers with either remaining char or the ash products. The porous divider separating the oxygen carrier section and the fuel section in the fuel reactor provides significant advantage over current practices by largely preventing the mixing of char and ash with the oxygen carrier in order to avoid attendant issues such as carbon leakage and oxygen carrier interactions with ash. Additionally, the porous divider separating the oxygen carrier section and fuel section during the gasification and combustion processes allows for the use of various gasification catalysts in conjunction with a solid carbonaceous fuel in a manner greatly mitigating any potential impact on the oxygen carrier.

In operation, a solid carbonaceous fuel is introduced to the fuel section and an oxidized carrier is introduced to the oxygen carrier section. The oxidized carrier may be an oxygen uncoupling oxygen carrier which liberates oxygen as a result of temperature and partial pressure conditions, such as $CuO$, $Mn_3O_4$, or $Co_3O_4$, or may be a $CO/H_2$ reducing oxygen carrier which is reduced by $H_2$ and $CO$, such as $Fe_2O_3$. In either case, the porous divider functions to allow gases generated in a respective section to pass through the porous divider and impact solid constituents in the separated section, in order to generate necessary reactions.

The novel process and principles of operation are further discussed in the following description.

BRIEF DESCRIPTION OF TILE DRAWINGS

DETAILED DESCRIPTION

Figure 1:
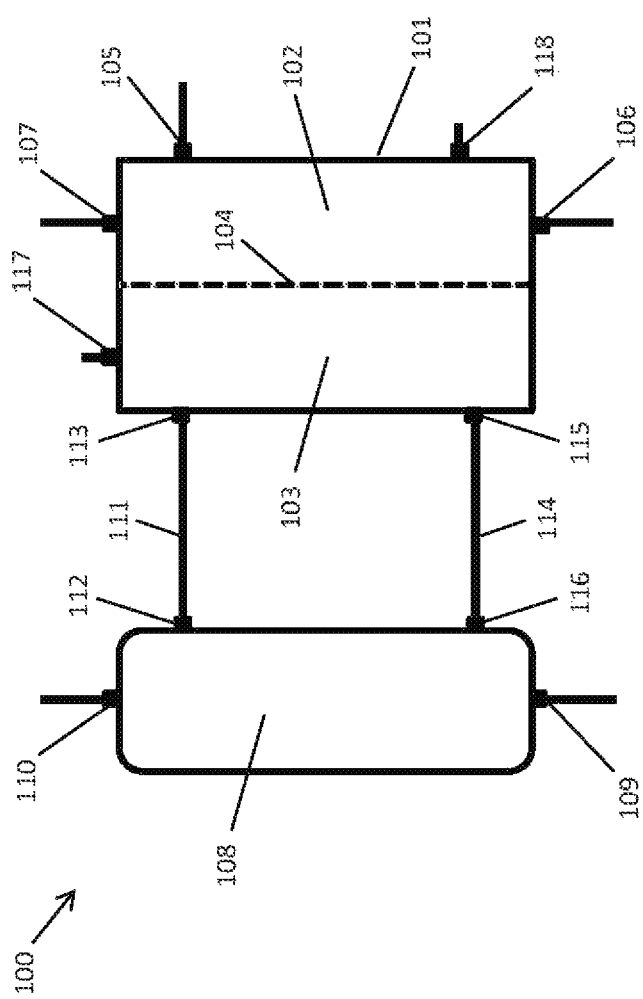
FIG. 1 illustrates a chemical looping system utilizing the fuel reactor.

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a chemical looping combustion apparatus and process utilizing a fuel reactor having a fuel section and an oxygen carne section separated by a porous divider, where the porous divider provides for fluid communication between the fuel section and the oxygen carrier section while preventing the passage of solids greater than a specific size.

The apparatus and method is discussed with reference to FIG. 1. At FIG. 1, fuel reactor 101 is comprised of fuel section 102 and oxygen carrier section 103. Additionally, fuel reactor 101 is comprised of porous divider 104 separating fuel section 102 and oxygen carrier section 103. Porous divider 104 is comprised of a material allowing fluid communication between fuel section 102 and oxygen carrier section 103 while preventing the migration of solids of a particular size, for example, particles generally less than about 25 microns. Porous divider 104 separates fuel section 102 and oxygen carrier section 103 such that a particle must encounter and pass through porous divider 104 in order to transfer from fuel section 102 to oxygen carrier section 103, or vice-versa. Porous divider 104 may be comprised of screen, mesh, or other materials which provide fur fluid communication between the respective sections while preventing the transfer of solids larger than a specific size. Additionally, fuel reactor 101 is comprised of fuel inlet 105 and ash outlet 106 in fluid communication with fuel section 102, further comprised of oxidized carrier inlet 113 and reduced carrier discharge 115 in fluid communication with oxygen carrier section 103, and further comprised of combustion gas outlet 107 in fluid communication with the internal volume of fuel reactor 101.

Maintaining particle segregation between oxygen carrier section 103 and fuel section 102 during the gasification and combustion processes allows gases generated in either section to participate in necessary reactions while greatly mitigating or preventing any mixture of the oxidized and reduced carriers with either remaining char or the ash products. This arrangement has clear advantage over typical fuel reactor arrangements, where a solid carbonaceous fuel such as coal is physically mixed with the oxidized carrier, and the carrier, remaining char, and ash products must be separated. Typically the necessary separation processes are driven by differences in density, and loss of some portion of the oxygen carrier via incomplete separation is inevitable. In addition, direct mixture of the oxidized and reduced carriers with the ash product significantly impacts the oxygen transfer capabilities of the oxygen carrier through the formation of various compounds, such as aluminates and silicates. These losses directly impact the expected effective lifetime of the carrier. Further, in the direct-mixing fuel reactors, some unconverted char becomes entrained and exits the fuel reactor with the reduced carrier, necessitating the use of a carbon separation system between the fuel reactor and the oxidation reactor. Inevitably, some of the unconverted char passes to the oxidation reactor and undergoes combustion, compromising any $CO_2$ capture efforts associated with combustion in the fuel reactor. The porous divider separating the oxygen carrier section and the fuel section in the fuel reactor disclosed here provides significant advantage over current practices by largely preventing the mixing and char and ash with the oxygen carrier in order to avoid the attendant issues. Additionally, the porous divider separating the oxygen carrier section and fuel section during the gasification and combustion processes allows for the use of various gasification catalysts in conjunction with a solid carbonaceous fuel in a manner greatly mitigating any potential impact on the oxygen carrier in oxygen carrier section 103. The necessary residence time in the fuel reactor for char gasification is a limiting constraint with chemical looping systems utilizing solid carbonaceous fuels.

Fuel section 102 and oxygen carrier section 103 respectively are separate, distinct, and non intersecting three dimensional volumes within fuel reactor 101, with porous divider 104 separating the separate, distinct, and non-intersecting three dimensional volumes as stated. Here, "separating" as it pertains to fuel section 102 and oxygen carrier section 103 means that porous divider 104 is geometrically located within fuel reactor 101 between the three-dimensional volume of fuel section 102 and the three-dimensional volume of oxygen carrier section 103, and that fluid communication between fuel section 102 and oxygen carrier section 103 within the bounds of fuel reactor 101 may only occur via a pathway that intersects porous divider 104. Porous divider 104 thus separates fuel section 102 and oxygen carrier section 103 such that a particle must encounter and pass through porous divider 104 in order to transfer from fuel section 102 to oxygen carrier section 103, or vice versa.

In an embodiment, fuel reactor 101 is a component in a chemical looping combustion system further comprised of oxidation reactor 108, oxidized carrier conduit 111, and reduced carrier conduit 114. Oxidation reactor 108 is comprised of oxidized carrier discharge 112, reduced carrier inlet 113, air inlet 109, and vitiated air outlet 110, all in fluid communication with the internal volume of oxygen reactor 108. Further, in the chemical looping combustion system, oxidation conduit 111 maintains fluid communication between the oxidized carrier discharge 112 of oxidation reactor 108 and the oxidized carrier inlet 113 of fuel reactor 101. and reduced carrier conduit 114 maintains fluid communication between the reduced carrier discharge 115 of fuel reactor 101 and the reduced carrier inlet 116 of oxidation reactor 108.

In operation, a solid carbonaceous fuel is introduced through fuel inlet 105 and contained in fuel section 102 of fuel reactor 101, and an oxidized carrier is introduced through oxidized carrier inlet 113 and contained in oxygen carrier section 103. The oxidized carrier may be an oxygen uncoupling oxygen carrier which liberates oxygen as a result of temperature and partial pressure conditions, such as CuO, $Mn_3O_4$, or $Co_3O_4$, or may be a $CO/H_2$ reducing oxygen carrier which is reduced by $H_2$ and CO, such as $Fe_2O_3$. In either case, porous divider 104 functions to allow gases generated in a respective section to pass through the porous divider and contact solid constituents in the separated section, in order to generate necessary reactions while mitigating or preventing mixture of the oxidized and reduced carriers with remaining char and ash products, extending oxygen carrier useful life and minimizing carbon leakage to oxidation reactor 108. In an embodiment, a gasification catalyst is additionally introduced into fuel section 102 of fuel reactor 101, in order to increase the rate of gasification of the solid carbonaceous fuel.

Within this disclosure, an "oxygen uncoupling oxygen carrier" means a metal oxide comprised of a metal and oxygen and having a chemical equilibrium with gaseous oxygen and a reduced product, where the reduced product is comprised of the metal or a metal oxide with a lower oxidation state than the original. Under a reducing temperature and an $O_2$ partial pressure condition, the oxygen uncoupling oxygen earner produces the gaseous oxygen and the reduced product in a reduction reaction, and under an oxidizing temperature and $O_2$ partial pressure condition, the gaseous oxygen and the reduced product produce the oxygen uncoupling oxygen carrier in an oxidation reaction. When in chemical equilibrium, concentrations of the oxygen uncoupling oxygen carrier, the oxygen gas, and the reduced product respond according to Le Chatelier's principle, so that when the chemical system at equilibrium experiences a change in concentration, temperature, volume, or partial pressure, the equilibrium shifts to counteract the imposed change and new concentrations are established, as is understood in the art. Within this disclosure, oxygen uncoupling oxygen carriers include but are not limited to metal oxides such as CuO, $Mn_2O_3$, and $Co_3O_4$.

Additionally, within this disclosure, the term "equilibrium partial pressure of oxygen" refers to a partial pressure of oxygen over a chemical compound comprised of oxygen, where the chemical compound has a chemical equilibrium with gaseous oxygen and a product, and where the equilibrium partial pressure of oxygen maintains the chemical equilibrium among the chemical compound, the gaseous oxygen, and the product at a given temperature Additionally within this disclosure, a "$CO/H_2$ reducing oxygen carrier" means a metal oxide comprised of a metal and oxygen and having a chemical equilibrium with gaseous CO or $H_2$ and a reduced product, where the reduced product is comprised of the metal or a metal oxide at a lower oxidation state. Under a reducing temperature and a CO or $H_2$ partial pressure condition, the $CO/H_2$ reducing oxygen carrier produces gaseous $CO_2$ or $H_2O$ respectively and the reduced product in a reduction reaction. When in chemical equilibrium, concentrations of the $CO/H_2$ reducing oxygen carrier, the gaseous CO or $H_2$, and the reduced product respond according to Le Chatelier's principle, so that when the chemical system at equilibrium experiences a change in concentration, temperature, volume, or partial pressure, the equilibrium shifts to counteract the imposed change and new concentrations are established, as is understood in the art. Within this disclosure. $CO/H_2$ reducing oxygen carriers include but are not limited to metal oxides such as $Fe_2O_3$, NiO, and $CaSO_4$.

Additionally within this disclosure, a "solid carbonaceous fuel" means a solid comprised of carbon, such as coal, petcoke, char, biomass or other fuels.

Additionally within this disclosure, a "gasification catalyst" means a material which increases the gasification reactivity of the solid carbonaceous Fuel under the conditions within the fuel section of the fuel reactor. In an embodiment, the gasification catalyst is comprised of alkali metals, transition metals, or a combination thereof.

In a particular embodiment, fuel reactor 101 is further comprised of sweeping gas inlet 117 in fluid communication with oxygen carrier section 103, and the system of FIG. 1 is utilized with an oxygen uncoupling oxygen carrier for combustion of the solid carbonaceous fuel. In this embodiment, the oxidized carrier is discharged from oxidized carrier inlet 113 into oxygen carrier section 103 of fuel reactor 101, and heated to a reducing temperature sufficient to generate a reduction reaction, reducing the oxygen carrier and generating a reduced carrier and gaseous oxygen. Concurrently, a sweep gas issues from sweeping gas inlet 117 and into oxygen carrier section 103 at a rate sufficient to maintain a partial pressure of oxygen over the oxidized carrier below the equilibrium partial pressure of oxygen at the reducing temperature. Following the reduction, some portion of the liberated oxygen transfers through porous divider 104 from oxygen carrier section 103 to fuel section 102, either through diffusion, a differential pressure generated by the sweeping gas, or a combination.

Concurrently, a solid carbonaceous fuel is discharged through fuel inlet 105 into fuel section 102 of the fuel reactor 101. The solid carbonaceous fuel is contacted by gaseous oxygen liberated from the oxygen uncoupling oxygen carrier, and fuel section 102 is maintained at a combustion temperature sufficient to cause the liberated oxygen to react with the solid carbonaceous fuel, generating, combustion gases comprised of $CO_2$ and $H_2O$, and an ash residue. The combustion gases are ejected from fuel reactor 101 through the combustion gas outlet 107, and the ash residue is ejected from fuel reactor 101 via ash outlet 106.

Typically, the solid carbonaceous fuel is further comprised of volatiles and fuel section 102 is maintained at a temperature sufficient to volatize the solid carbonaceous fuel and generate volatization gases comprised of a hydrocarbon gas, as well as other gases such as $H_2$, CO, and $CO_2$. In this embodiment, some portion of the volatization gases may transfer across porous divider 104 from fuel section 102 to oxygen carrier section 103, generating a further reduction reaction in oxygen carrier section 103. For example, in this embodiment, the oxidized carrier may be CuO and liberate oxygen in a reduction reaction to $Cu_2O$, followed by contact with gases generated through fuel volitization and further reduction to Cu. In addition to allowing the oxidized carrier to deliver additional oxygen to fuel reactor 101 and thereby reducing oxidized earner inventory requirements, the additional reduction from $Cu_2O$ is Cu is an exothermic reaction, which can assist in maintaining temperatures within fuel reactor 101.

Following generation of the reduced carrier, the reduced carrier is transported through reduced carrier discharge 115 and reduced carrier conduit 114 and issued through reduced carrier inlet 116 of oxidation reactor 108, where oxidation reactor 108 is maintained at art oxidation temperature. Within oxidation reactor 108, a partial pressure of oxygen above the equilibrium partial pressure of oxygen over the reduced carrier at the oxidizing temperature is established by introducing an oxidizing gas comprised of oxygen through air inlet 109 of oxidation reactor 108, and contacting the reduced carrier and the oxidizing gas within oxidation reactor 108. Under these conditions, the reduced carrier undergoes oxidation and produces regenerated carrier and vitiated air, where the vitiated it is the oxidizing gas less the oxygen utilized in the oxidation reaction, and the regenerated carrier is a metal oxide having the same chemical composition as the oxidized carrier. The vitiated air is discharged from oxidation reactor 108 through vitiated air outlet of 110. The process as described may he continuously conducted in a cyclic fashion by transferring the regenerated carrier through oxidized carrier discharge 112 of oxygen reactor 108 and through oxidized carrier conduit 111 for discharge through oxidized carrier inlet 113 into oxygen carrier section 103 of fuel reactor 101.

In another embodiment, fuel reactor 101 is further comprised of gasification agent inlet 118 in fluid communication with fuel section 102, and the system of FIG. 1 is utilized with a $CO/H_2$ reducing oxygen carrier for combustion of the solid carbonaceous fuel. In this embodiment, the solid carbonaceous fuel is discharged through fuel inlet 105 into fuel section 102 of fuel reactor 101, and a gasification agent comprised of $H_2O$, $CO_2$, or a combination is issued through gasification agent inlet 118. The gasification agent and the solid carbonaceous fuel are contacted within fuel section 102, and fuel section 102 is maintained at a temperature sufficient to generate gasification gases comprised of CO and $H_2$. Following the gasification, some portion of the gasification gases transfers through porous divider 104 from fuel section 102 to oxygen carrier section 103, either through diffusion, a differential pressure generated by the gasification agent, or a combination, Typically, the solid carbonaceous fuel is further comprised of volatiles and fuel section 102 is maintained at a temperature sufficient to volatize the solid carbonaceous fuel, generating volatization gases which may additionally transfer across porous divider 104 from fuel section 102 to oxygen carrier section 103.

Concurrently, the oxygen carrier is discharged from oxidized carrier inlet 113 into oxygen carrier section 103 of fuel reactor 101. The oxygen carrier within oxygen carrier section 103 is contacted by the gasification gases and possibly the volatization gases, generating a reduced carrier and combustion gases comprised of $CO_2$ and $H_2O$, and an ash residue. The combustion gases are ejected from fuel reactor 101 through the combustion gas outlet 107, and the ash residue is ejected from fuel reactor 101 via ash outlet 106.

Following generation of the reduced carrier, the reduced carrier is transported through reduced carrier discharge 115 and reduced carrier conduit 114 and issued through reduced carrier inlet 116 of oxidation reactor 108, where oxidation reactor 108 is maintained at an oxidation temperature. Within oxidation reactor 108, a partial pressure of oxygen above the equilibrium partial pressure of oxygen over the reduced carrier at the oxidizing temperature is established by introducing an oxidizing gas comprised of oxygen through air inlet 109 of oxidation reactor 108, and contacting the reduced carrier and the oxidizing gas within oxidation reactor 108. Under these conditions, the reduced carrier undergoes oxidation and produces a regenerated carrier and vitiated air, where the vitiated air is the oxidizing gas less the oxygen utilized in the oxidation reaction, and the regenerated carrier is a metal oxide having the same chemical composition as the oxidized carrier. The vitiated air is discharged from oxidation reactor 108 through vitiated air outlet 110. The process as described may be continuously conducted in a cyclic fashion by transferring the regenerated carrier through oxidized carrier discharge 112 of oxygen reactor 108 and through oxidized carrier conduit 111 for discharge through oxidized carrier inlet 113 into oxygen carrier section 103 of fuel reactor 101.

It is understood. that when the methodology describes various temperatures within fuel reactor 101 such as a reducing temperature, a combustion temperature, a temperature sufficient to volatize the solid carbonaceous fuel, a temperature sufficient to generate gasification gases, and other descriptions, this is not intended to imply a requirement that different temperature ranges be utilized for each separate descriptor. The various temperatures May all be substantially equivalent, provided that the reaction or action associated with each of the various described temperatures is accomplished.

Figure 2A:
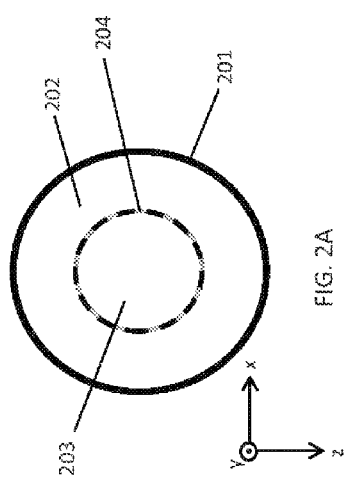
FIG. 2A illustrates a first embodiment of the fuel reactor from a first perspective.
Figure 2B:
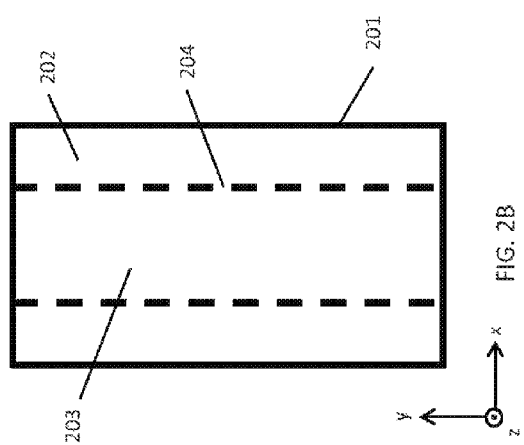
FIG. 2B illustrates the first embodiment of the fuel reactor from a second perspective.

The fuel reactor is not limited to any particular geometric configuration, provided that porous divider 104 is geometrically located within fuel reactor 101 between the three-dimensional volume of fuel section 102 and the three-dimensional volume of oxygen carrier section 103, and that fluid communication between fuel section 102 and oxygen earner section 103 within the bounds of fuel reactor 101 may only occur via a pathway that intersects porous divider 104. However, because fluid communication between fuel section 102 and oxygen carrier section 103 is necessary to accomplish the looping combustion as described herein, configurations which maximize the surface area of porous divider 104 relative to the volume of fuel section 102 or oxygen carrier section 103 may be advantageous. For example, FIG. 2A illustrates an overhead view of a particular fuel reactor 201 oriented with respect to the x-y-z axis shown, with the y-axis proceeding out of the page. In this configuration, fuel section 202 is an annular cylinder surrounding oxygen carrier section 203, and separated by oxygen carrier section 203 by cylindrical porous divider 204. The same fuel reactor 202 is illustrated at FIG. 2B, rotated in accordance with the x-y-z axis illustrated. The annular and cylindrical arrangement illustrated has the advantage of providing a relatively large porous divider 204 surface area relative to the respective volumes of fuel section 202 and oxygen carrier section 203. Fuel reactor 201 is additionally comprised of a fuel inlet (not shown), ash outlet (not shown), oxidized carrier inlet (not shown), reduced carrier discharge (not shown), and combustion gas outlet (not shown) having relationships with fuel section 202 and oxygen carrier section 203 as earlier described.

Figure 3A:
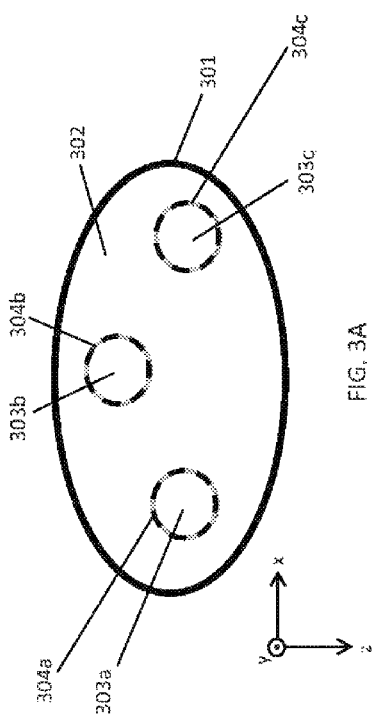
FIG. 3A illustrates a second embodiment of the fuel reactor from a first perspective.
Figure 3B:
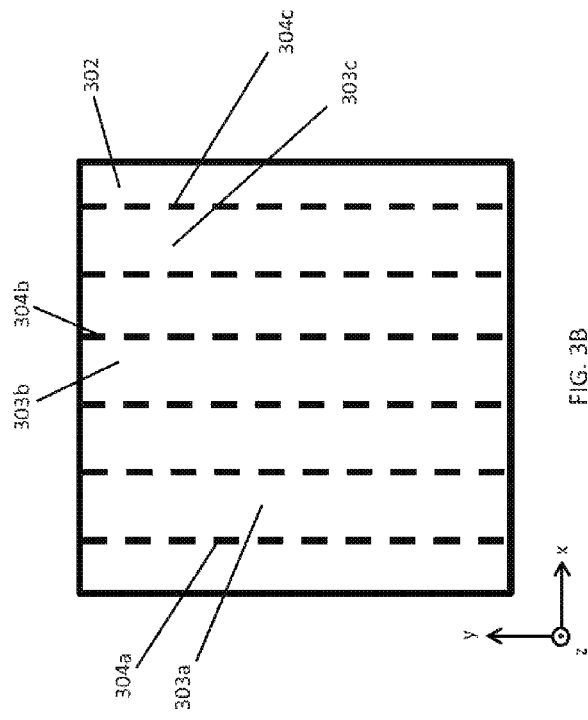
FIG. 3B illustrates the second embodiment of the fuel reactor from a second perspective.

Additionally, the oxygen carrier section may be comprised of a plurality of individual oxygen carrier sections, the fuel section may be comprised of a plurality of individual fuel sections, and the porous divider may be comprised of a plurality of individual porous dividers, provided that each oxygen carrier section is separated from each filet section by at least one individual porous divider. For example, FIG. 3A illustrates an overhead view of a particular fuel reactor 301 oriented with respect to the x-y-z axis shown, with the y-axis proceeding out of the page, and illustrating a fuel section 302 and an oxygen carrier section comprised of a plurality of individual oxygen carrier sections 303a, 303b, and 303c. Additionally, the porous divider of fuel reactor 301 is comprised of a plurality of individual porous dividers 304a, 304b, and 304c as indicated. The same fuel reactor 302 is illustrated at FIG. 3B, rotated in accordance with the x-y-z axis illustrated. As shown at FIGS. 3A and 3B, each oxygen carrier section in the plurality of individual oxygen carrier sections 303a, 303b, and 303c is separated from fuel section 302 by at least one individual porous divider in the plurality of individual porous dividers 304a, 304b, and 304c.

Figure 4:
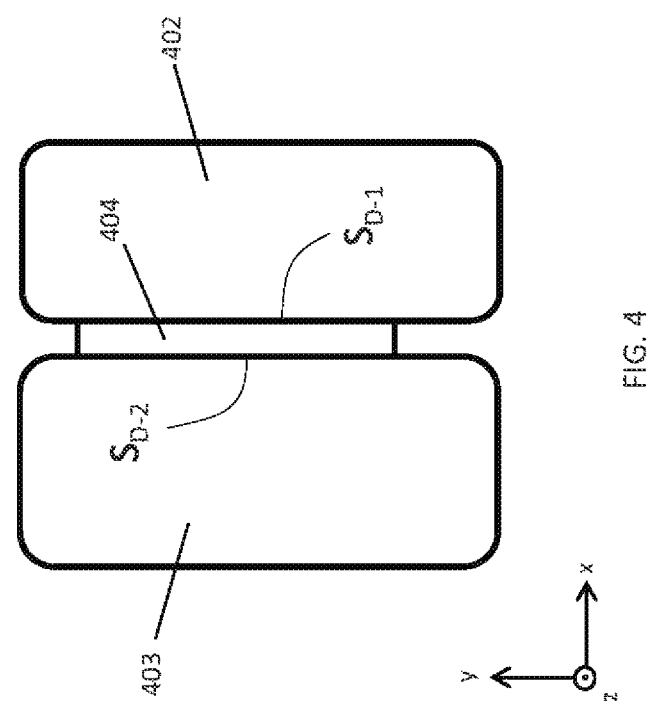
FIG. 4 illustrates a particular fuel section, oxygen carrier section, and porous divider relationship.

In an embodiment, the fuel reactor has a ratio $S_D/V_R$, where $S_D$ is a surface area of the porous divider, and $V_R$ is the combined volume of the fuel section and the oxygen carrier section. In this embodiment, the ratio $S_D/V_R$ is greater than 0.1 in$^{-1}$ (1/inch). Here, "the surface area of the porous divider" means a total surface area of the porous divider in contact with either the fuel section or the oxygen carrier section volume boundary, where "in contact" means that the boundary of the fuel section or the oxygen carrier section extends to the porous divider. For example, at FIG. 4, a fuel section 402 and an oxygen carrier section 403 within a filet reactor are separated by porous divider 404. The boundary of fuel section 402 extends to porous divider 404 and is in contact with porous divider 404 over a surface area $S_{D-1}$, while the boundary of oxygen carrier section 403 also extends to porous divider 404 and is in contact with porous divider 404 over a surface area $S_{D-2}$. At FIG. 4, fuel section 402 and oxygen carrier section 403 are separate, distinct, non-intersecting three dimensional volumes are discussed, and the areas $S_{D-1}$ and $S_{D-2}$ are parallel to the z-axis indicated. If the volume of fuel section 402 is $V_F$ and the volume of oxygen carrier section 403 is $V_O$, then in this embodiment, either $S_{D-1}/(V_F+V_O)$ or $S_{D-2}/(V_F+V_O)$ is greater than 0.1 in$^{-1}$.

The oxidizing and reducing reactors may establish contact between gaseous and solid phases using any means known in the art, and may incorporate a rotary kiln, moving beds of particles, fluidized beds, fixed beds, or other methods known in the art. Transport of the particles or pellets between reactors may be accomplished in a variety of ways, including moving bed arrangements, fluidized transfer of pellets, and other means known to those skilled in the art. For example, a reactor may be a high velocity fluidized bed where particles are transported together with an exiting gas flow to the top of the air reactor, and then transferred to a second reactor via a cyclone. Similarly, a reactor may be bubbling fluidized bed reactor with particles transported to a second reactor by an overflow pipe. Additionally, within the method disclosed herein, heat may be transferred between oxidizing reactor 108, fuel reactor 101, and the various gas streams utilized or generated. in order to mitigate heat duty requirements. Further, various gaseous streams such as vitiated air exiting vitiated air outlet 110 and combustion gases exiting combustion gas outlet 107 may be additionally utilized for power generation by providing motive force to a turbine, through heat exchange for the generation of steam, or other methods known in the art. Combustion gases exiting combustion gas outlet 107 may also be subjected to various $CO_2$ sequestration methods known in the art, and may additionally be utilized as fluidization or gasification agents within the process.

The method thus provides for an apparatus and method utilizing a fuel reactor comprised of a fuel section and an oxygen carrier section, and further comprised of a porous divider separating the fuel section and the oxygen carrier section. The porous divider allows fluid communication between the fuel section and the oxygen carrier section while preventing the migration of solids of a particular size. Maintaining particle segregation between the oxygen carrier section and the fuel section during solid fuel gasification and combustion processes allows gases generated in either section to participate in necessary reactions, while greatly mitigating or preventing any mixture of the oxidized and reduced carriers with either remaining char or the ash products.

It is to he understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. it is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A method of chemical looping combustion comprising:
   placing an oxygen uncoupling oxygen carrier into an oxygen carrier section of a fuel reactor;
   inserting a solid carbonaceous fuel into a fuel section of the fuel reactor;
   producing an $Me_xO_y$ oxidized carrier by establishing the oxygen uncoupling oxygen carrier at a reducing temperature and maintaining a partial pressure of oxygen in the oxygen carrier section below the equilibrium partial pressure of oxygen over the oxygen uncoupling oxygen carrier at the reducing temperature, thereby generating gaseous oxygen and the $Me_xO_y$ oxidized carrier in the oxygen carrier section of the fuel reactor;
   utilizing some portion of the solid carbonaceous fuel to generate gases comprising CO and generate an ash residue;
   moving the gaseous oxygen through a porous divider separating the fuel section of fuel reactor and the oxygen carrier section of the fuel reactor from the oxygen carrier section of the fuel reactor to the fuel section of the fuel reactor while migrating the gases comprising CO from the fuel section of the fuel reactor to the oxygen carrier section of the fuel reactor and contacting the gases comprising CO and the $Me_xO_y$ oxidized carrier in the oxygen carrier section of the fuel reactor;
   heating the $Me_xO_y$ oxidized carrier to a temperature sufficient to generate a reduction reaction with the gases comprising CO, where the reduction reaction reduces the $Me_xO_y$ oxidized carrier to a reduced carrier and generates combustion gases comprising $CO_2$, and where the temperature is less than he melting temperature of the oxygen carrier and less than the melting temperature of the reduced carrier, thereby generating the reduced carrier and the combustion gases:

causing a combustion reaction in the fuel carrier section of the fuel reactor between another portion of the solid carbonaceous fuel and the gaseous oxygen and generating additional combustion gases comprising $CO_2$ and an additional ash residue;

removing the combustion gases comprising $CO_2$ and the additional combustion gases comprising $CO_2$ from the fuel reactor; and displacing the ash residue and the additional ash residue from the fuel section of the fuel reactor.

2. The method of claim 1 further comprising transporting the reduced carrier through a reduced carrier inlet into a reduced carrier conduit and discharging the reduced carrier through a reduced carrier outlet of the reduced carrier conduit into an oxidation reactor;

instituting an oxidizing temperature the oxidation reactor, where the oxidation temperature is sufficient to generate an oxidation reaction, where the oxidation reaction oxidizes the reduced carrier to produce a regenerated carrier, and where the regenerated carrier has the same composition as the oxygen uncoupling oxygen carrier, and where the oxidizing temperature is less than the melting temperature of the reduced carrier and less than the melting temperature of the regenerated carrier;

creating a partial pressure of oxygen in the oxidizing reactor above the equilibrium partial pressure of oxygen over the oxygen carrier at the oxidizing temperature by introducing an oxidizing gas through an air inlet of the oxidation reactor, and contacting the reduced carrier and the oxidizing as in the oxidation reactor, thereby generating the regenerated carrier and a vitiated air, and discharging a flow of the vitiated flow from the oxidation reactor through the vitiated air outlet of the oxidation reactor;

transferring the regenerated carrier through an oxidized carrier inlet of an oxidized carrier conduit, and transferring the regenerated carrier to an oxidized carrier outlet of the oxidized carrier conduit; and repeating the placing step, the inserting step, the producing step, the utilizing step, the moving step, the heating step, the causing step, the removing step, the displacing step, the transporting step, the instituting step, the creating step, and the transferring step using the regenerated carrier as the oxygen uncoupling oxygen carrier.

3. The method of claim 2 further comprising fluidizing the $Me_xO_y$ oxidized carrier in the oxygen carrier section of the fuel reactor and fluidizing the solid carbonaceous fuel in the fuel section of the fuel reactor.

4. The method of claim 1 further comprising:

issuing a gasification agent into the fuel section of the fuel reactor;

establishing the fuel section of the fuel reactor at a gasification temperature sufficient to gasify the solid carbonaceous fuel in contact with the gasification agent and generate gasification gases, where the gasification gases are comprised of CO, thereby generating the gases comprising CO and the ash residue; and moving the gasification gases through the porous divider from the fuel section of the fuel reactor to the oxygen carrier section of the fuel reactor, thereby migrating the gases comprising CO from the fuel section of the fuel reactor to the oxygen carrier section of the fuel reactor through the porous divider.

5. The method of claim 1 further comprising:

volatizing the some portion of the solid carbonaceous fuel in the fuel section and generating volatization gases comprised of CO, thereby generating the gases comprising CO; and moving the volatization gases through the porous divider from the fuel section of the fuel reactor to the oxygen carrier section of the fuel reactor, thereby migrating the gases comprising CO from the fuel section of the fuel reactor to the oxygen carrier section of the fuel reactor through the porous divider.

6. The method of claim 1 further comprising:

issuing a gasification agent into the fuel section of the fuel reactor;

establishing the fuel section of the fuel reactor at a gasification temperature sufficient to gasify the solid carbonaceous fuel in contact with the gasification agent and generate gasification gases, where the gasification gases are comprised of a first CO;

volatizing the some portion of the solid carbonaceous fuel in the fuel section and generating volatization gases comprised of a second CO; and moving the first CO and the second CO through the porous divider from the fuel section of the fuel reactor to the oxygen carrier section of the fuel reactor, thereby migrating the gases comprising CO from the fuel section of the fuel reactor to the oxygen carrier section of the fuel reactor through the porous divider.

7. The method of claim 1 further comprising fluidizing the oxygen uncoupling oxygen carrier in the oxygen carrier section of the fuel reactor.

8. The method of claim 1 where the oxygen uncoupling oxygen carrier comprises $CuO$, $Mn_2O_4$, or $Co_3O_4$.

9. The method of claim 7 where the oxygen uncoupling oxygen carrier comprises CuO and where the $Me_xO_y$ oxidized carrier comprises $Cu_2O$.

* * * * *